Patented Nov. 29, 1949

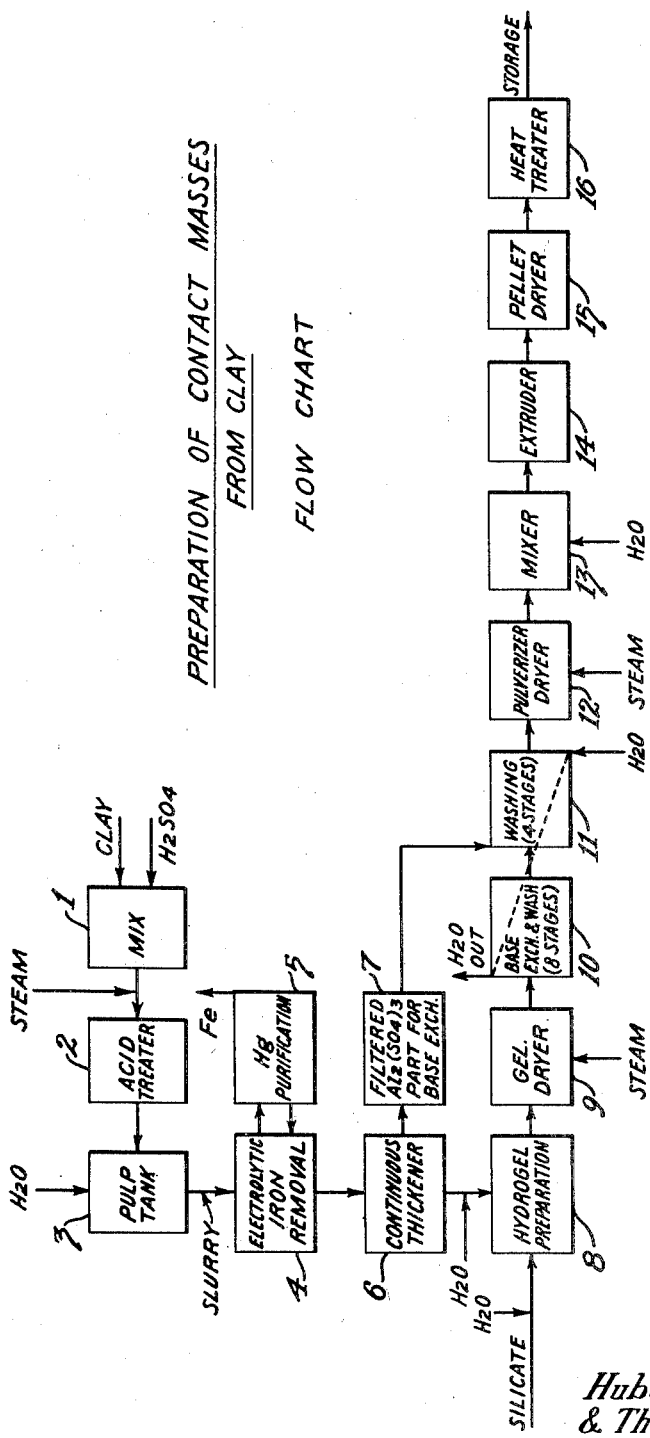

UNITED STATES PATENT OFFICE 2,489,333

2,489,333

PREPARATION OF A CATALYST COMPOSITE OF SILICA-ALUMINA GEL ON ACID-TREATED CLAY

Hubert A. Shabaker, Media, and Thomas H. Milliken, Jr., Moylan, Pa., assignors to Houdry Process Corporation, Wilmington, Del., a corporation of Delaware Application June 27, 1946, Serial No. 679,730

5 Claims. (Cl. 252—450)

The present invention relates to the preparation from clay of contact masses of lowered iron content and is particularly concerned with the preparation of such contact masses having improved properties as catalysts in hydrocarbon conversion processes.

The process of the invention involves a novel system and sequence of steps whereby clay is subjected to acid treatment and the obtained acid slurry comprising undissolved clay solids, and aluminum and iron compounds in solution is subjected to purification to remove the dissolved iron. A portion of the purified slurry containing dissolved aluminum salts is then reacted with a silicate solution in the presence of the clay solids, thereby forming a composite of acid treated clay and silica-alumina gel. A separated portion of the purified acid slurry, comprising chiefly an aluminum salt solution, may be reserved for use in a subsequent step of purifying the clay-gel composite.

The process of the present invention constitutes a further practical adaptation of the processes for preparing improved contact masses from clays described in the copending application of Hubert A. Shabaker, Serial No. 666,177, and in the application of George Alexander Mills and Edward B. Cornelius, Serial No. 666,179, both filed April 30, 1946.

Although the principal objectives of the invention are directed to the provision of an efficient and economical procedure for the essentially continuous production of clay-gel composites, various aspects of the invention and individual novel steps thereof may be advantageously employed apart from the principal process described, and are included within the scope of the invention, as hereinafter described.

In the accompanying drawing there is diagrammatically represented a flow chart illustrating a preferred embodiment of the present invention.

Although the hereinafter described procedure is equally applicable to other clays including for instance the familiar acid-activable sub-bentonites, the details of the process will be described as applied to a clay of the kaolin type. A typical example of such clay may have approximately the following composition (dry basis):

| | Per cent |
|---|---|
| Ignition loss | 15 |
| $SiO_2$ | 47 |
| $Al_2O_3$ | 37 |
| $Fe_2O_3$ | 0.8 |
| Other | 0.2 |

Referring now to the flow sheet shown in the accompanying drawing, the raw clay is first mixed with concentrated sulfuric acid to form essentially a stiff mix. Any form of mixer 1 capable of handling solids or viscous pulps may be employed, such as the familiar Lancaster type mixer. The quantity of acid advantageously employed is that precalculated to extract and furnish the desired quantity of aluminum salt for use in subsequent steps of the process, so that the acid-clay mix except for dilution with water to form a slurry of desired concentration will require no further adjustment in the process. For example, in the preparation of a catalyst comprising 65% undissolved clay solids and 35% silica-alumina gel (90% $SiO_2$/10% $Al_2O_3$) from the type of clay illustrated, there may be employed between 20–25%, as about 22.5%, of 66° Bé. sulfuric acid to the dry weight of the clay. Other mineral acid, such as hydrochloric, may be substituted. The mix of clay and acid is then heated for about an hour or so to below the boiling point of the acid, as to about 180–210° F. by the admission of steam to the mixer or in a separate treater 2. The heated mix is transferred to a pulp tank 3 where it is diluted with water to form a slurry. In this stage and more particularly in later stages of the process, it is preferred to employ water, free from contaminants which may have an adverse effect on the product, wherefore demineralized or distilled water is advantageously employed.

The clay slurry adjusted by the water addition to desired density is then pumped or otherwise passed into electrolytic cells 4 for purification to remove iron. Advantageously a series of such cells are employed and means are provided for regeneration of the electrode on which the iron from the slurry is deposited. For instance four such cells may be provided, permitting gravitational flow of the slurry through the series, each cell having a lead anode and a mercury cathode. The iron, in solution as sulfate in the slurry, is removed electrolytically by the mercury cathode as the slurry flows through the series of cells. The mercury is constantly regenerated by passing the used mercury from the iron removal cells to a second series of cells 5 in which electrolytic iron is employed as the cathode, the mercury becoming the anode therein. Iron is recovered from the cells 5 as electrolytic iron and the clean mercury returned for further use in the cells 4. By this step all or practically all of the dissolved iron is removed from the slurry, although any residual iron present in the clay solids which has not been attacked or dissolved during the acid treatment remains substantially unaffected.

Since the product produced at a later stage is to be subjected to treatment to remove alkali metal ions particularly, it will be found advantageous at this time to reserve a portion of the purified acid liquor containing aluminum sulfate, for use at such later stage. Accordingly, the slurry is thickened at 6 by filtering off a portion of the substantially clear solution which is transferred to a suitable receptacle or tank 7. The clear solution filtered off may comprise about half or slightly less than that amount of the total aluminum salt content of the slurry.

The slurry is now ready for preparation of the hydrogel. A solution of alkali metal silicate diluted with water to desired concentration is added to the slurry from 6 also previously diluted with water, in a suitable reaction chamber 8 provided with means for agitating the liquids. The reactant liquids are continuously contacted and mixed to form a precipitate or hydrosol setting to a hydrogel of silica-alumina containing the clay solids of the slurry. The chamber 8 may be in the form of jet mixer or spray nozzle provided with ports for admission of the several liquids which may be mixed by the velocity of the streams of liquid admitted, and/or mechanical agitators may also be provided therein. A suitable form of apparatus for rapid and continuous production of gels from reactants is that described in U. S. Patent 2,370,200 of February 27, 1945. The quantity of silicate employed is that calculated to combine with the aluminum in solution in the slurry to furnish the desired ratio of $SiO_2/Al_2O_3$ in the gel, as for example to furnish 90 parts by weight of $SiO_2$ to 10 parts of $Al_2O_3$.

The hydrosol formed in the mixing device 8 is flowed onto a conveyor such as a moving belt on which it sets to a hydrogel, or if desired, conditions may be controlled so that setting takes place as the product issues from the mixer. In either case the hydrogel is conveyed to a dryer 9 where the moisture content is substantially reduced as to about 5% (dry basis). Preferably the hydrogel product is moved through the drier on a belt at a calculated rate co-ordinated with temperature and humidity to effect the desired degree and rate of drying during passage of the product through the drier. As shown in the drawing, steam is preferably admitted to the drier to control temperature and humidity, although other drying gases such as air or mixtures of steam and air may be employed. Temperatures in the order of 180-240° F. in the drier are suitable. The product entering the drier should be advantageously in granular form, which can be readily effected by providing a cutting or comminuting device in advance of the drier. The dried gel coming out of the drier may now be passed to the next treatment, or, if desired, stored for later processing.

The dried gel from the preceding step is purified by being subjected to a number of water-washing and chemical treating steps. This may be done in a countercurrent system as shown diagrammatically at 10 and 11 of the drawing. The gel is passed successively through a series of washing stages and stages where it is contacted with the purified aluminum sulfate from 7, reserved from a previous stage of acid treating the clay. The washing and treating steps may be carried out in separate tanks of about twelve in number or a like number of stages may be provided in one or more tanks by partitioning or the like as in a Dorr treater. In either case the gel is passed countercurrent to the wash water and treating fluid, so that the more concentrated fresh aluminum sulfate is contacted with already partially treated gel from the previous stage and the final washing is done with clean water. The water used here is also preferably a treated water such as demineralized or distilled water. The aluminum sulfate solution is initially introduced at about the eighth stage or tank in the direction of the movement of the gel.

The washed material is discharged from the final washing stage and transferred by belt or other conveyor to apparatus for drying and grinding such as a combined pulverizer-drier 12, suitable forms of which are known in the art. As shown, heat for drying may be supplied by steam. The dry ground powder may then be passed to the next stage or conveyed as by a blower to storage for later processing.

The powdered gel is mixed with water to suitable consistency and plasticity for extrusion, which may be done in any appropriate mixer 13, such as an edge-runner or Lancaster mixer. The plastic mass is fed to an extruder 14 wherein it is forced through dies of desired size and the strands formed cut into desired lengths, as for example, pellets may be formed of 4 mm. diameter and cut to approximately 4 mm. length.

The pellets are fed to a pellet drier 15 which is preferably of the continuous type, and passed through at controlled temperature in the order of about 120°–200° F. so that the drying is not too rapid; a period of more than two hours being usually required.

The pellets are now ready for final calcination, which is carried out in a heat treater 16, at temperatures above 500° F., with hot air, steam or mixtures of steam and air. For instance, the heat treatment may be effected by subjecting the pellets to a temperature of 1050° F. for 2 hours in the absence of steam, or a more severe treatment may involve a temperature of 1400° F. for ten hours in the presence of 5% by weight of steam. The heat treater 16 may be a muffle furnace or other high temperature treater, but it is preferred to employ a continuous type of treater with the pellets moving through at required rate, a pressure burner being advantageously employed to heat the air.

From the heat treater the catalyst is stored in suitable bins or silos from which it may be removed as required for use or for packaging for shipment.

Advantageously, means are provided for screening the pellets so as to remove pieces of non-standard size as well as to remove fines. For instance sorting screens of appropriate size may be provided between the pellet drier 15 and the heat treater 16 and shaking screens to sift out fines may also be provided for the pellets leaving the heat treater.

As will be readily understood the entire series of treatments described may be carried out as a continuous operation without interruption from the point of initial mixing of the acid and clay to the final calcination of the pellets. By fixing the size of the conduits and with appropriate setting of proportionating valves, the entire operation can be conducted substantially automatically. Although as above indicated, storage receptacles may be provided for the gel leaving the gel drier 9, for the powder from the pulverizer 12, and for the aluminum sulfate solution at 7, these are merely temporary storage means for convenience and add to the flexibility of the operations. For instance, the quantity of aluminum sulfate solution filtered from the slurry and passed to the container 7 may be substantially equal to that discharged therefrom to the tank or treater 11 thereby maintaining approximately a constant level in the container 7.

Although, as illustrated in the preferred embodiment, the hydrogel composited with clay solids is dried at 9 previous to purification and washing, in some instances it may be desirable to omit this drying step and to purify and wash the hydrogel in the undried state. The hydrogel is subjected to the washing and purifying treatment advantageously in subdivided form such as small lumps, which may be obtained by cutting or comminuting the set hydrogel or by controlling the formation of the hydrogel so that small pieces are directly obtained. Thus, the hydrosol prepared at 8 may be formed into droplets by contact with a water-immiscible liquid which droplets set to hydrogel as in the known preparation of catalysts of the "bead" type. The hydrogel beads so formed or small lumps of hydrogel otherwise obtained may then be readily washed and purified without intermediate drying.

Ordinarily, the quantity and concentration of acid will be precalculated so that no further adjustment of pH in the preparation of the hydrogel at 8 should be required. To extend the flexibility of the described process, however, provision may be made for the addition of other substances to control or modify the pH or other conditions affecting hydrogel formation, which substances may be admixed with the thickened slurry from 6, or added to the silicate solution or separately run in at 8. Such substances may be for instance additional acid, or alkaline materials, hydrolyzable salts or buffering agents. For base-exchanging the dried or undried gel at 10, the process of the invention is not confined to the use of the aluminum sulfate solution from 7 as is, since if desired the pH of this solution may also be modified by addition of acidic or alkaline substances and base exchange with other chemical treating agents as or instance ammonium salts may be carried out at this stage.

Obviously many modifications and variations of the invention as hereinbefore set forth may be made without departing from the spirit and scope thereof and therefore only such limitations should be imposed as are indicated in the appended claims.

We claim as our invention:

1. In the production of contact masses from clay containing iron compounds, the steps comprising: mixing the clay with concentrated mineral acid to a stiff mix, heating the mix to a temperature below the boiling point of the acid and diluting the mix with water to form a suspension comprising dissolved acid-extracted substances and residual clay solids, subjecting the suspension to electrolysis to effect removal of iron dissolved therein, admixing the purified suspension with a solution of alkali metal silicate to form with aluminum salts present therein a silica-alumina reaction product embedding the suspended clay solids, permitting the reaction product to set to a hydrogel, drying the hydrogel and subjecting the obtained dried gel to a series of steps including washing and treating with aluminum salt, drying the washed gel, adding water thereto to form a plastic mix and forming the mix into pellets.

2. In the production of catalytic contact masses from clay, the steps comprising: mixing clay with mineral acid to form a slurry, subjecting the slurry comprising dissolved acid extracted iron and aluminum salts and residual clay solids to electrolysis to effect removal of iron from the slurry, thickening the thus purified slurry by removing a liquid portion containing dissolved aluminum salts therein for use in a later stage, adding water to the thickened slurry to form a diluted suspension, admixing the diluted suspension containing the remaining aluminum salts with a solution of alkali metal silicate to form a composite of precipitated silica-alumina reaction product incorporated with the suspended clay solids, permitting the reaction product of the composite to set to a hydrogel, subjecting the composite to a series of steps including washing and treating with aluminum salt, the aluminum salt being that previously removed in thickening the suspension as above set forth, drying the washed gel composite and adding water thereto to form a plastic mix, shaping the mix into pellets, drying and calcining the pellets.

3. In the production of catalytic contact masses from clay, the steps comprising: mixing clay with mineral acid to form a slurry, subjecting the slurry comprising dissolved acid extracted iron and aluminum salts and residual clay solids to electrolysis to effect removal of iron from the slurry, thickening the thus purified slurry by removing a liquid portion containing dissolved aluminum salts therein for use in a later stage, adding water to the thickened slurry to form a diluted suspension, admixing the diluted suspension containing the remaining aluminum salts with a solution of alkali metal silicate to form a composite of precipitated silica-alumina reaction product incorporated with the suspended clay solids, permitting the reaction product of the composite to set to a hydrogel, drying the hydrogel-containing composite and subjecting the obtained dried gel composite to a series of steps including washing and treating with aluminum salt, the aluminum salt being that previously removed in thickening the suspension as above set forth, drying the washed gel composite and adding water thereto to form a plastic mix, shaping the mix into pellets, drying and calcining the pellets.

4. In the production of contact masses from clay, the steps comprising: mixing clay with a calculated quantity of concentrated mineral acid to dissolve a desired portion of the aluminum content thereof, diluting the mixture of clay and acid to form a suspension, subjecting the suspension comprising the acid extract containing dissolved aluminum with accompanying fluxing salts and residual clay solids to electrolytic contact with a mercury electrode to effect removal of dissolved iron contained in the extract, thickening the thus purified suspension by removing a liquid portion containing dissolved aluminum salts therein for use in a later stage, further diluting the thickened suspension with water and admixing the resulting diluted suspension containing the remaining aluminum salts with a solution of alkali metal silicate to form a silica-alumina reaction product incorporating the suspended clay solids, permitting the reaction product to set to a hydrogel, drying the hydrogel containing the clay solids and subjecting the obtained dried gel composite to a series of steps including washing and treating with aluminum salt, the aluminum salt being that previously removed in thickening the suspension as above set forth, drying the washed gel, adding water thereto to obtain a plastic mix, and forming the mix into pellets.

5. In the production of catalytic contact masses from clay containing iron compounds, the steps comprising: mixing the clay with concentrated sulfuric acid to dissolve a predetermined portion of the aluminum content of the clay, diluting the mix to form a slurry subjecting the slurry comprising dissolved iron and aluminum salts and residual clay solids to electrolytic purification to effect removal of the iron salts, thickening the thus purified slurry, by removing a liquid portion containing dissolved aluminum salts therein for use in a later stage, diluting the thickened slurry with water and reacting aluminum salts in the resulting diluted slurry with a solution of sodium silicate to form a silica-alumina reaction product composited with the suspended clay solids, drying the composite, washing the dried composite and replacing sodium therein by treatment with a solution of an aluminum salt, the aluminum salt solution being the liquid portion previously removed in thickening the slurry as above set forth, drying the washed gel, and adding water thereto to obtain a plastic mix, forming the mix into pellets, drying and calcining the formed pellets at a temperature of at least 1050° F.

HUBERT A. SHABAKER.
THOMAS H. MILLIKEN, JR.

REFERENCES CITED

The following references are of record in the file of this patent:

UNITED STATES PATENTS

| Number | Name | Date |
| --- | --- | --- |
| 1,570,353 | Jacobssen | Jan. 19, 1926 |
| 1,642,871 | Chappel et al. | Sept. 20, 1927 |
| 1,900,996 | Palmaer | Mar. 14, 1933 |
| 2,320,799 | Ruthruff | June 1, 1943 |
| 2,326,706 | Thomas et al. | Aug. 10, 1943 |
| 2,374,313 | Veltman | Apr. 24, 1945 |
| 2,402,668 | Roller | June 25, 1946 |